United States Patent [19]
Dutertre et al.

[11] Patent Number: 5,863,450
[45] Date of Patent: Jan. 26, 1999

[54] PROCESS FOR MAKING A PLANE MAGNETIC HEAD AND MAGNETIC HEAD OBTAINED BY THIS PROCESS

[75] Inventors: Pierre Dutertre, La Riviere; Jean-Pierre Lazzari, Corenc, both of France

[73] Assignees: Commissariat a l'Energie Atomique, Paris; Silmag Societe Anonyme, Saint-Engreve Cedex, both of France

[21] Appl. No.: 743,531

[22] Filed: Nov. 4, 1996

[30] Foreign Application Priority Data

Apr. 4, 1955 [FR] France .................................. 95-46/87

[51] Int. Cl.⁶ ....................................................... B44C 1/22
[52] U.S. Cl. .................................. 216/27; 216/22; 216/38
[58] Field of Search ........................... 216/22, 38; 29/603

[56] References Cited

U.S. PATENT DOCUMENTS

| | | | |
|---|---|---|---|
| Re. 33,343 | 10/1990 | Lazzari | 216/22 |
| 4,391,849 | 7/1983 | Bichoff | 216/22 X |
| 4,698,708 | 10/1987 | Lazzari . | |
| 5,013,394 | 5/1991 | Rolland et al. | 216/22 |
| 5,228,184 | 7/1993 | Kishi . | |

FOREIGN PATENT DOCUMENTS

| | | |
|---|---|---|
| 0 508 565 | 10/1992 | European Pat. Off. . |
| 0 617 407 | 9/1994 | European Pat. Off. . |
| 2 242 743 | 3/1975 | France . |
| 4-298806 | 10/1992 | Japan . |
| WO 95/23878 | 9/1995 | WIPO . |

OTHER PUBLICATIONS

Database WPI, Derwent Publications, AN 92–402351, Patent Abstracts of Japan, vol. 17, No. 109 (p–1497), and JP-A-04 298 806, Oct. 22, 1992.
Patent Abstracts of Japan, Vol. 16, No. 404 (p–1410), Aug. 26, 1992, and JP-A-04 134609, May 8, 1992.
Patent Abstracts of Japan, Vol. 10, No. 97 (p–446), Apr. 15, 1986, JP-A-60 229217, November 14, 1985.
Patent Abstracts of Japan, vol. 16, No. 504 (P–1439), Oct. 19, 1992, JP-4 182911, Jun. 30, 1992.
IBM Technical Disclosure Bulletin, Vol. 29, No. 4, pp. 1875–1876, Sep. 1986, "Ferrite Head Design and Fabrication".
IBM Technical Disclosure Bulletin, Vol. 9, No. 9, p. 1085, Feb. 1967, W.M. Groben, et al., "Wear Coating for a Tape Head".

*Primary Examiner*—William Powell
*Attorney, Agent, or Firm*—Oblon, Spivak, McClelland, Maier & Neustadt, P.C.

[57] ABSTRACT

Process for making a plane magnetic head and magnetic head obtained by this process.

A hard protective layer surrounds polar parts. The nonmagnetic spacer and polar parts are flush with the level of this protective layer. This layer is preferably made of diamond like carbon.

14 Claims, 4 Drawing Sheets

PROCESS FOR MAKING A PLANE MAGNETIC HEAD AND MAGNETIC HEAD OBTAINED BY THIS PROCESS

TECHNICAL FIELD

The purpose of this invention is a process for making a plane magnetic head and a magnetic head obtained by this process.

It is used for magnetic recording either on a tape, rigid disk or any other media.

STATE OF PRIOR ART

FIG. 1 attached shows a section through a known horizontal magnetic head, for example as described in document EP-A-0 262 028.

The head shown comprises a substrate 10, a first magnetic layer 12, two magnetic studs or stands 14, 15 supported at the two ends of the first magnetic layer 12, a conducting coil 16 embedded in an insulating layer 18 and surrounding the two studs 14, 15, a relief or upstand or insulating area 20 located above the central part of the coil, a second magnetic layer 21 on each side of the insulating relief 20, two polar parts 23, 24 separated by a non-magnetic spacer 22, and a protective insulating layer 32.

This type of head is usually made as follows:

deposit the first magnetic layer on the substrate then deposit the insulating layer, form the two magnetic studs and the conducting winding in this insulating layer, then form the insulating relief above the insulating layer, make the second magnetic layer on each side of the insulating relief in contact with the magnetic studs, form a non-magnetic spacer at the top of the insulating relief, deposit an upper magnetic layer on the central insulating relief and above the non-magnetic spacer, cover the upper magnetic layer with an insulating layer, then make the assembly plane so that it is flush with the spacer and polar parts.

The document mentioned above describes each of these various steps in the process in more detail.

To prevent wear of this type of head and the harmful consequences resulting from this wear (such as the creation of particles that could damage the head and/or the recording medium), it was proposed to cover the head with a thin layer of a very hard material such as diamond like carbon (DLC). This layer of the order of 10 nm thick is usually deposited by cathodic spraying. It reduces friction phenomena and results in a very long head life. However, this solution has a disadvantage. It moves the head from the recording medium, and consequently increases losses and reduces the head sensitivity.

DESCRIPTION OF INVENTION

The purpose of this invention is to overcome this disadvantage. Consequently, this invention proposes a process for making a magnetic head in which the hard protective layer is at the same level as the top of the non-magnetic spacer, and no longer above the spacer. Therefore, this layer performs its wear protection role, but without increasing the spacing between the head and the recording medium.

Therefore, the precise objective of this invention is a process for making a plane type magnetic head comprising firstly a number of operations known in the state of the art:

a first magnetic layer is deposited on a substrate, an insulating layer is then deposited on the assembly, two magnetic studs are then formed on this insulating layer in contact with the first magnetic layer and a conducting winding, an insulating relief is formed above the insulating layer, a second magnetic layer is created on each side of the insulating relief and in contact with the magnetic studs, a non-magnetic spacer is formed on top of the insulating relief, an upper magnetic layer is deposited on the central insulating relief and above the non-magnetic spacer, the upper magnetic layer is covered with an insulating layer.

The process according to the invention is characterized in that it is continued by the following operations:

the upper magnetic layer and the insulating layer are made plane but not sufficiently to make the non-magnetic spacer flush with the surface, the insulating layer is engraved to lower its surface below the level of the top of the non-magnetic spacer, a protective layer made of hard material is deposited on the assembly, the upper magnetic layer is made plane using the protective layer as the reference surface, until the polar parts and the top of the spacer are at the same level as the protective layer.

Another purpose of this invention is a plane magnetic head obtained by the process defined above. The plane head according to the invention comprises firstly a number of known means like a substrate, a first magnetic layer, two magnetic studs, an insulating layer with an insulating relief above it, a second magnetic layer on each side of the insulating relief, a non-magnetic spacer located on the insulating relief, two polar parts on each side of the non-magnetic spacer and an insulating layer surrounding the polar parts. The magnetic head according to the invention is characterized in that the insulating layer surrounding the polar parts has a surface located below the level of the top of the spacer; the head also comprises a protective layer made of hard material covering the insulating layer; polar parts and the top of the non-magnetic spacer are flush with the protective layer made of hard material.

In the invention, the thin protective layer is preferably made of diamond like carbon. The thickness of this layer is preferably between 10 and 20 nm.

In one preferred embodiment, the head also includes a thin bond layer between the insulating layer and the protective layer. Preferably, this thin bond layer is made of a material taken from a group consisting of tungsten, chromium and titanium-tungsten. It is preferably between 50 and 500 nm thick.

BRIEF DESCRIPTION OF THE DRAWINGS

finally

DETAILED DESCRIPTION OF EMBODIMENTS

Figure 1:
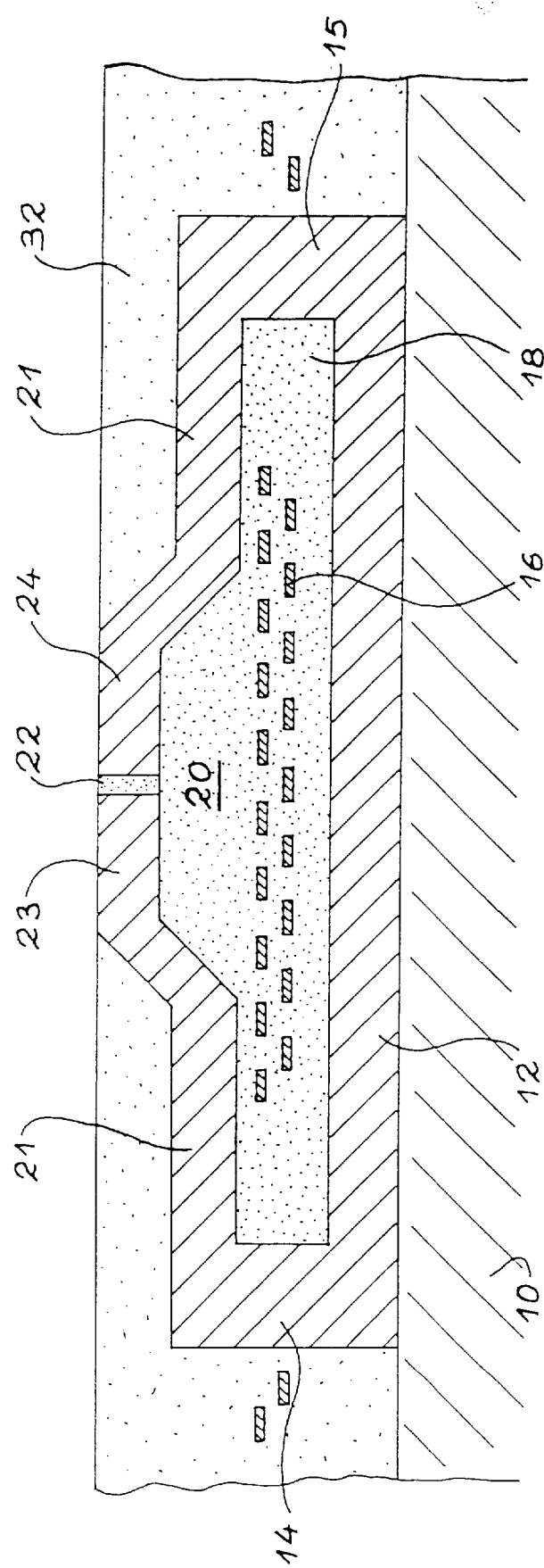
FIG. 1, already described, shows a section through a known plane head.
Figure 2:
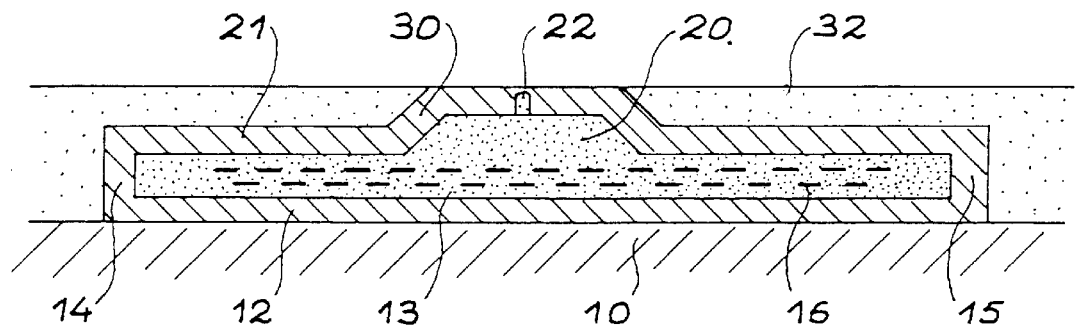
FIG. 2 shows a first step in making a head following the process according to the invention.

FIG. 2 shows a section of a subassembly obtained after application of the known operations described previously. This subassembly comprises a lower magnetic layer 12, two magnetic studs or stands 14 and 15, a conducting winding 16, a trapezoidal central relief 20, and a magnetic layer 21 on each side of the relief, on a substrate 10. A non-magnetic spacer 22 surrounded by an upper magnetic layer 30 is placed on top of the central relief. The central part is surrounded by an ordinary protective layer 32.

A first approach towards making this subassembly plane was carried out, bringing the upper magnetic layer 30 and the insulating layer 32 to the same level. But this planing operation was interrupted before the top spacer 22 became flush with the surface of the magnetic layer. In other words, the air gap is not yet open. This spacer 22 is still embedded in the magnetic layer 30.

Figure 3:
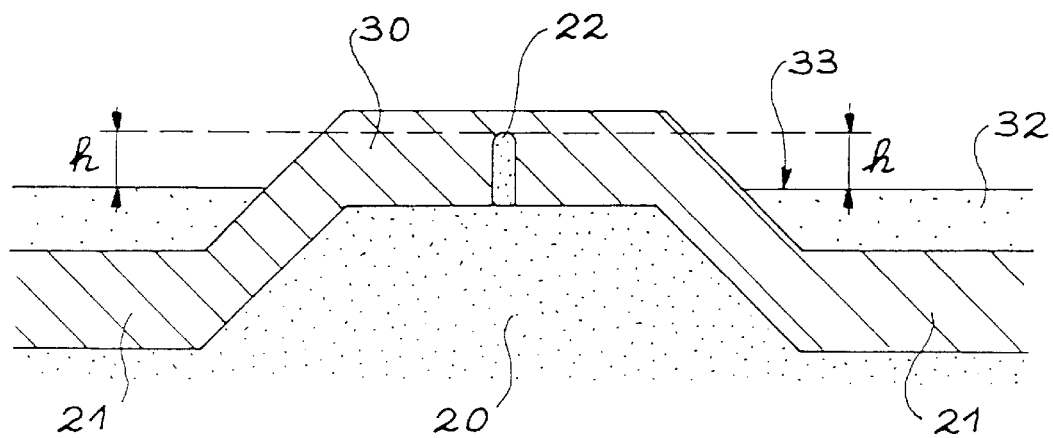
FIG. 3 shows a sectional detail through the upper part of the head.

In the second step illustrated in FIG. 3, the insulator 32 is engraved, for example by reactive ionic engraving. This engraving does not affect the magnetic layer 30. The engraving depth is such that the plane 33 of insulating layer 32 passes below the top of spacer 22. The spacing between the top of the spacer and the plane of the engraved insulating layer is denoted h in FIG. 3. The engraving depth of the insulator may be between 0.1 $\mu$m and a few microns. The insulator 32 may be made of silica ($SiO_2$).

Figure 4:
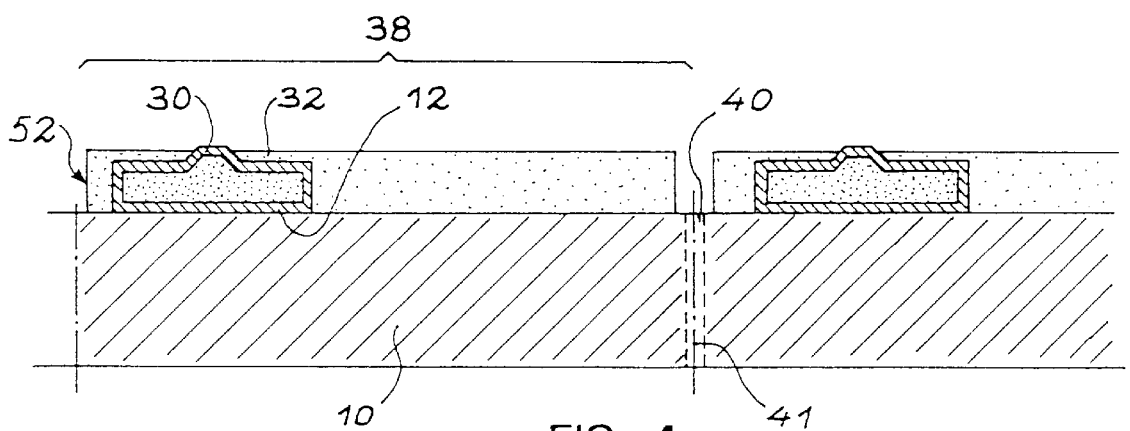
FIG. 4 is a sectional view along the longitudinal center line of one of the rails of a flight runner.

A magnetic head is usually not made individually and in an isolated manner. It is obtained collectively, with its flight runner with other heads. In this case, the substrate supports a large number of runners, each with one or several heads. FIG. 4 thus shows a longitudinal section of a substrate 10 and a flight runner 38 along one of its rail 52, in fact the rail that supports the head which is at the back of the rail.

Figure 8:
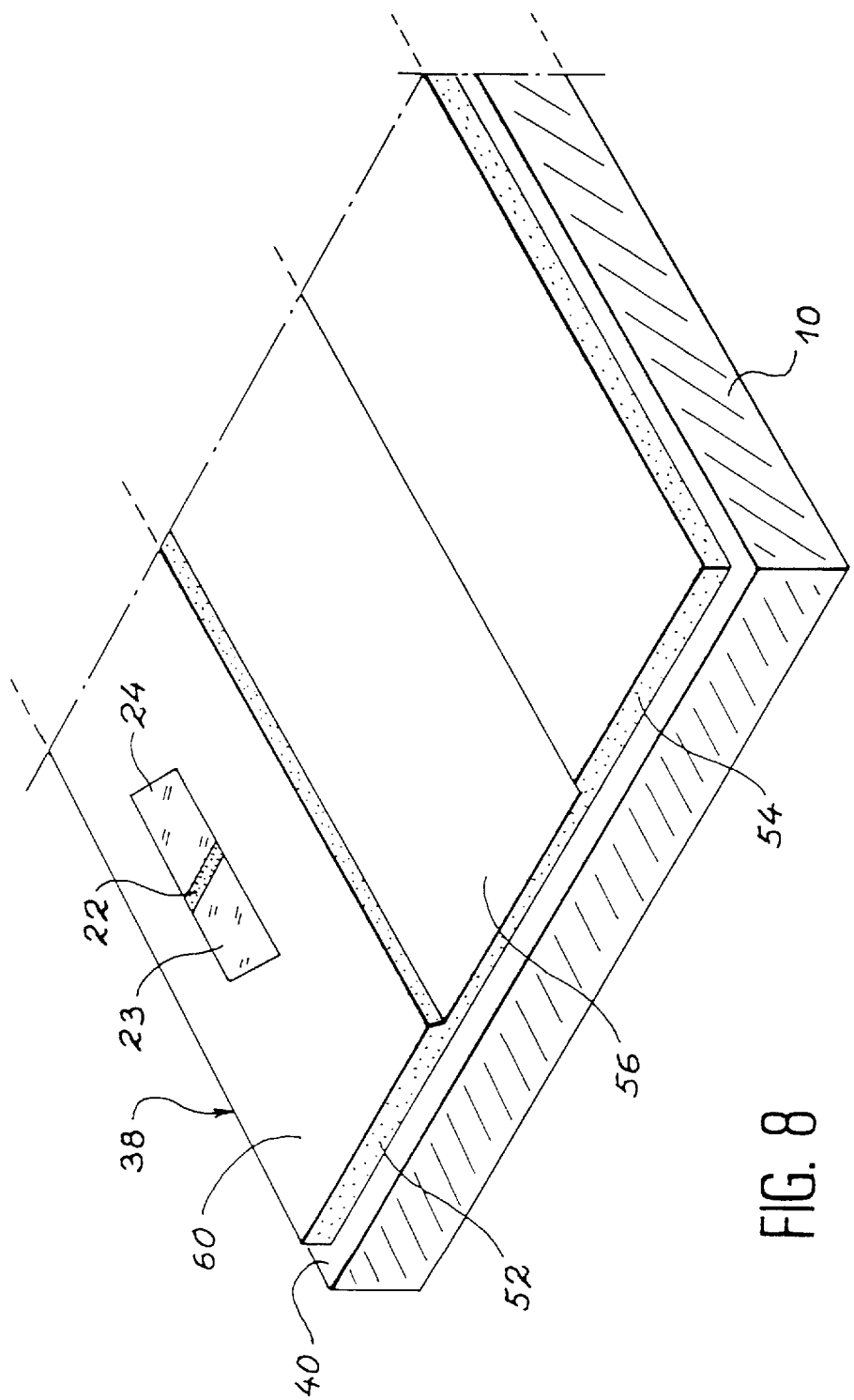
FIG. 8 is a perspective view showing the rear part of a catamaran type flight runner with a magnetic head on one of the rails and with a peripheral offset to guarantee contact on the substrate.

The flight runner is obtained by photolithography followed by reactive ionic engraving of the insulator. FIG. 8, which will be described later, shows a catamaran shaped flight runner.

In the flight runner formation operation, a deep engraving of the insulator 32 is carried out until reaching the substrate at the periphery of the runner. FIG. 4 shows this deep engraving under reference 40. The width of this engraving exceeds the width of the saw line, so that the runners can be separated from each other at the end of the process. The future runner cutting path is denoted 41 in FIG. 4.

Figure 5:
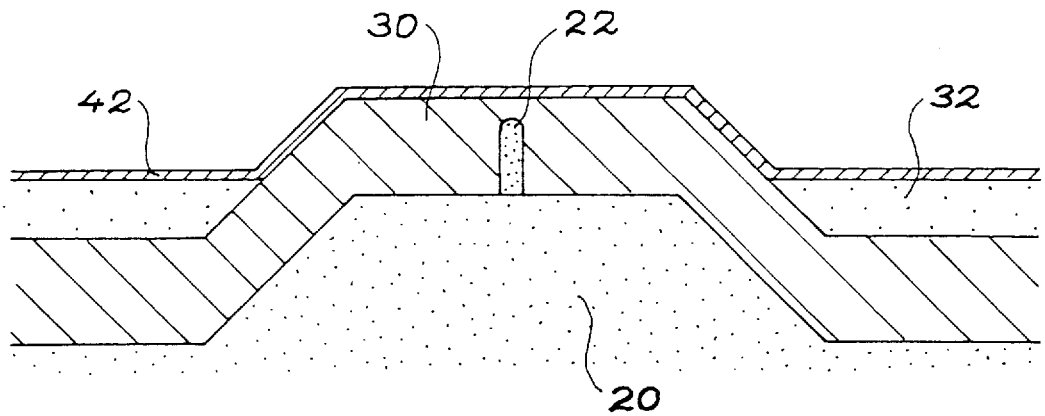
FIG. 5 shows an additional step in the process of depositing a bond and shielding layer.

At the end of this engraving step, a thin layer of hard material with a good bond is deposited on the head and runner assembly. This layer is denoted 42 in FIG. 5. It may be made of tungsten, chromium or titanium-tungsten. For example, this material may be deposited by cathodic spraying. It may be of the order of 50 to 500 nm thick.

This bond layer will come into contact with the substrate by means of peripheral engraving of the runner. The substrate will preferably be made of a conducting material such as silicon, or some ceramics. Since the bond layer made with one of the materials mentioned will itself be conducting, it will be in electrical contact with the substrate. This thin conducting layer will carry away electrostatic charges accumulated during relative movements of the recording layer with respect to the head. It therefore forms electrical shielding.

Figure 6:
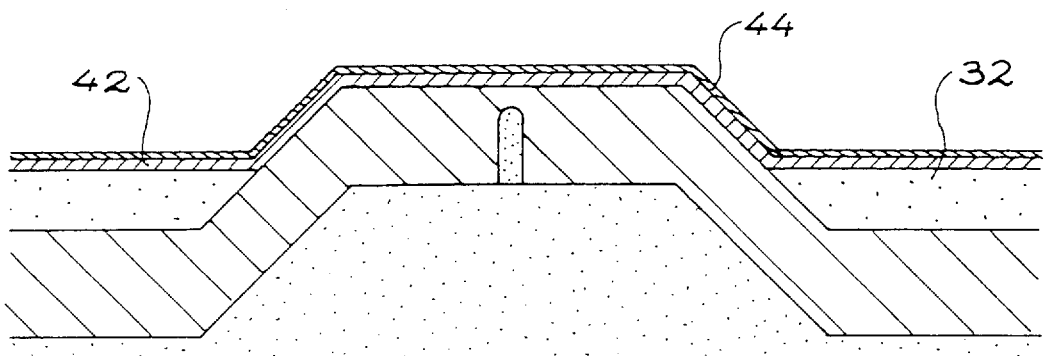
FIG. 6 shows another additional step in the process of depositing a hard protective layer.

A very thin protective layer 44 is then deposited on the bond layer 42 (see FIG. 6). This layer is made of hard material and preferably of diamond like carbon. It may be of the order of 10 to 20 nm thick.

Figure 7:
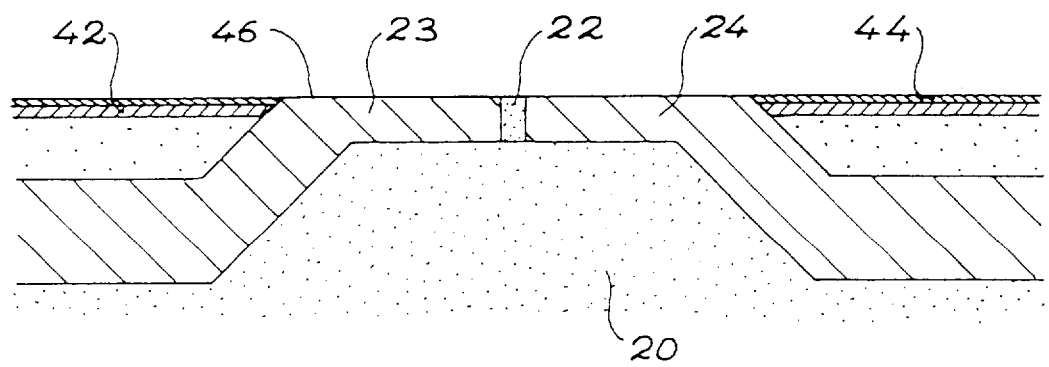
FIG. 7 shows the result of making the head plane.

The surface is then finally made plane (FIG. 7), using the protective layer 44 located on each side of the central relief as the reference surface. Sufficient material is removed during this operation to uncover the top of the spacer 22. The upper magnetic layer is then divided into two polar parts 23 and 24, which are flush with the level of the hard protective layer 44. Therefore, this layer must play its protective role without moving polar parts away from the recording medium.

The final operation in making the surface plane may be done using any known process. But it is simplified in that:

the surface that is made plane is very small with respect to the stop surface, in general there are only two materials present, namely the material in polar parts (usually iron-nickel) and the material in the protective layer (usually diamond like carbon), the stop surface is very hard with respect to the material in the polar parts.

FIG. 8 shows a perspective view of the rear part of a catamaran type flight runner 38. The runner shown comprises a rail 52 supporting the magnetic head. The magnetic head is flush with the surface 60 forming the flight plane. More precisely, polar parts 23, 24 and the spacer 22 are flush. The runner also comprises another rail 54, the two rails being separated by an offset 56. FIG. 8 also shows a peripheral engraving 40 that bares substrate 10. The bond layer is supported on this surface 40 and also covers the runner and consequently forms electrical shielding. The hard protective layer covers the assembly and in particular the two rails 52 and 54. Finally, the hard protective layer defines the flight plane 60. Bond and protective layers are not shown in FIG. 8, so that the other layers can be seen.

We claim:

1. A process for making a planar type magnetic head comprising the steps of:

depositing a first magnetic layer on a substrate;

depositing a first insulating layer on said first magnetic layer;

forming two magnetic studs having first and second ends in said first insulating layer so that the first ends of said studs contact said first magnetic layer and a conducting winding;

forming an insulating relief having sides and a central portion above said first insulating layer;

forming a second magnetic layer on each side of said insulating relief and in contact with said magnetic studs;

forming a non-magnetic spacer on top of said insulating relief;

depositing an upper magnetic layer having a top surface above said non-magnetic spacer and on the central portion of said insulating relief;

forming a second insulating layer having a top surface on said upper magnetic layer;

planing said upper magnetic layer and said second insulating layer so that the top surface of said upper magnetic layer and the top surface of said second insulating layer form a planed surface, without making the non-magnetic spacer flush with said planed surface;

engraving said second insulating layer to lower its top surface below the level of the top of said magnetic spacer;

depositing a protective layer made of hard material and having a top surface on said second insulating layer;

planing said upper magnetic layer so that the top surface of said second insulating layer and the top of said magnetic spacer are level with the top surface of said upper magnetic layer and so that said upper magnetic layer is divided into polar parts.

2. A process according to claim 1, comprising the further step of depositing a bond layer on said second insulating layer before depositing said protective layer made of hard material.

3. A process according to claim 2, resulting in a magnetic head assembly and after the step of engraving, comprising the further steps of:

engraving said magnetic head assembly to define a contour and a flight runner profile having a periphery which will contain the magnetic head;

engraving the periphery of the flight runner sufficiently to uncover a contact surface on the substrate at the periphery of the runner;

depositing a thin bond and shielding layer made of conducting material on the assembly so that said bond and shielding layer comes into contact with said substrate at the runner periphery; and depositing said thin protective layer made of hard material on said thin bond and shielding layer.

4. A process according to any one of claims 1 to 3, wherein said thin protective layer is made of diamond like carbon.

5. A process according to claim 4, wherein said thin protective layer is between 10 and 20 nm thick.

6. A process according to claim 2, wherein said thin bond and shielding layer is made of material taken from the group comprising tungsten, chromium, and titanium-tungsten.

7. A process according to claim 6, wherein the thickness of said thin bond and shielding layer is between 50 and 500 nm.

8. A process according to claim 3, wherein said process is applied to several magnetic heads supported by several flight runners made on the same substrate, and wherein said step of engraving of the periphery of said flight runners at is carried out at the location of future cutting paths, said process comprising the further step of cutting the substrate along said cutting paths to separate said flight runners.

9. A process according to claim 3, wherein said thin bond and shielding layer is made of material taken from the group comprising tungsten, chromium, and titanium-tungsten.

10. A process according to claim 4, wherein said thin bond and shielding layer is made of material taken from the group comprising tungsten, chromium, and titanium-tungsten.

11. A process according to claim 5, wherein said thin bond and shielding layer is made of material taken from the group comprising tungsten, chromium, and titanium-tungsten.

12. A process according to claim 9, wherein the thickness of said thin bond and shielding layer is between 50 and 500 nm.

13. A process according to claim 10, wherein the thickness of said thin bond and shielding layer is between 50 and 500 nm.

14. A process according to claim 11, wherein the thickness of said thin bond and shielding layer is between 50 and 500 nm.

* * * * *

UNITED STATES PATENT AND TRADEMARK OFFICE
CERTIFICATE OF CORRECTION

PATENT NO. : 5,863,450
DATED : January 26, 1999
INVENTOR(S) : Pierre DUTERTRE, et al.

It is certified that error appears in the above-identified patent and that said Letters Patent is hereby corrected as shown below:

On the Title page, item [30] should be:

--[30] Foreign Application Priority Data
Nov. 22, 1995 [FR] France ............ 95 13854--

On the title page, in item [73], the second assignee's city should be:

--Saint-Egreve Cedex--

Signed and Sealed this

Fourteenth Day of September, 1999

*Attest:*

Q. TODD DICKINSON

*Attesting Officer*     *Acting Commissioner of Patents and Trademarks*